US008065743B2

(12) United States Patent
Numata

(10) Patent No.: US 8,065,743 B2
(45) Date of Patent: Nov. 22, 2011

(54) CONTENT USE MANAGEMENT SYSTEM, CONTENT-PROVIDING SYSTEM, CONTENT-USING DEVICE AND COMPUTER READABLE MEDIUM

(75) Inventor: Kenichi Numata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1188 days.

(21) Appl. No.: 11/558,058

(22) Filed: Nov. 9, 2006

(65) Prior Publication Data

US 2007/0266155 A1 Nov. 15, 2007

(30) Foreign Application Priority Data

May 9, 2006 (JP) ................................ 2006-130596

(51) Int. Cl.
*G06F 7/04* (2006.01)
*G06F 17/30* (2006.01)
*H04N 7/16* (2011.01)
(52) U.S. Cl. ........................................................ 726/30
(58) Field of Classification Search .................... 726/27, 726/30
See application file for complete search history.

(56) References Cited

U.S. PATENT DOCUMENTS

| 6,934,744 | B2* | 8/2005 | Sogabe et al. | 709/219 |
|---|---|---|---|---|
| 7,260,598 | B1* | 8/2007 | Liskov et al. | 709/201 |
| 7,281,032 | B2* | 10/2007 | Kodama | 709/217 |
| 7,287,157 | B2* | 10/2007 | Washio | 713/155 |
| 7,310,629 | B1* | 12/2007 | Mendelson et al. | 1/1 |
| 7,412,445 | B2* | 8/2008 | Isobe | 1/1 |
| 7,461,122 | B2* | 12/2008 | Kawana | 709/203 |
| 7,788,271 | B2* | 8/2010 | Soma et al. | 707/758 |
| 7,873,578 | B2* | 1/2011 | Johnson et al. | 705/56 |
| 2002/0076050 | A1* | 6/2002 | Chen et al. | 380/231 |
| 2002/0083438 | A1* | 6/2002 | So et al. | 725/31 |
| 2003/0023559 | A1* | 1/2003 | Choi et al. | 705/51 |
| 2003/0028639 | A1* | 2/2003 | Yamamoto et al. | 709/225 |
| 2003/0152901 | A1* | 8/2003 | Altenhofen et al. | 434/350 |
| 2003/0152902 | A1* | 8/2003 | Altenhofen et al. | 434/350 |
| 2003/0154390 | A1* | 8/2003 | Yamauchi et al. | 713/193 |
| 2003/0200432 | A1* | 10/2003 | Washio | 713/168 |
| 2003/0217008 | A1* | 11/2003 | Habegger et al. | 705/51 |
| 2004/0056891 | A1* | 3/2004 | Hiratsuka | 345/744 |
| 2004/0181598 | A1* | 9/2004 | Paya et al. | 709/227 |

(Continued)

FOREIGN PATENT DOCUMENTS

JP 2003060636 2/2003

*Primary Examiner* — David Garcia Cervetti
(74) *Attorney, Agent, or Firm* — Gesmer Updegrove LLP

(57) ABSTRACT

A content use management system includes a content-providing system and a content-using device. The content-providing system includes a providing unit that provides, to the content-using device, digital content having content identification information corresponding to user-side-specific information specific to the content-using device or a user of the content-using device, and a primary distribution destination field. The content-using device includes a first control unit that, when receiving an instruction for using digital content from a user, allows use of the digital content when content identification information included in the digital content corresponds to user-side specific information specific to the content-using device or a user of the content-using device, and executes a control process in accordance with a value of the primary distribution destination field of the digital content when the content identification information included in the digital content does not correspond to the user-side-specific information.

17 Claims, 9 Drawing Sheets

U.S. PATENT DOCUMENTS

| | | | |
|---|---|---|---|
| 2006/0190410 A1* | 8/2006 | Harper | 705/59 |
| 2006/0190413 A1* | 8/2006 | Harper | 705/65 |
| 2006/0206928 A1* | 9/2006 | Kamei et al. | 726/6 |
| 2006/0210084 A1* | 9/2006 | Fransdonk | 380/278 |
| 2006/0233519 A1* | 10/2006 | Narita | 386/95 |
| 2006/0294201 A1* | 12/2006 | Kito et al. | 709/217 |
| 2007/0162398 A1* | 7/2007 | Tadayon et al. | 705/54 |
| 2007/0204011 A1* | 8/2007 | Shaver et al. | 709/219 |
| 2007/0204064 A1* | 8/2007 | Mail et al. | 709/246 |
| 2007/0266155 A1* | 11/2007 | Numata | 709/225 |
| 2008/0077703 A1* | 3/2008 | Lee | 709/232 |
| 2008/0086639 A1* | 4/2008 | Kono et al. | 713/168 |
| 2008/0126363 A1* | 5/2008 | Isobe | 707/10 |
| 2008/0148349 A1* | 6/2008 | Stevens et al. | 726/2 |
| 2008/0165967 A1* | 7/2008 | Ross et al. | 380/258 |
| 2008/0184348 A1* | 7/2008 | Tanaka | 726/6 |
| 2008/0263637 A1* | 10/2008 | Nonaka et al. | 726/4 |
| 2010/0122332 A1* | 5/2010 | Kamei et al. | 726/6 |

* cited by examiner

| DATE AND TIME | EVENT | INTERNAL ID OF CONTENT | CONTENT ID AQUIRED | CONTENT ID ISSUED | USER-SIDE-SPECIFIC INFORMATION |
|---|---|---|---|---|---|
| 06/03/21/13:10:21 | ACQUISITION REQUEST | 001234 | — | α | A |
| 06/03/21/13:10:30 | USE REQUEST | 001234 | α | α | A |
| 06/03/22/10:10:05 | USE REQUEST | 001234 | α | β | C |
| 06/03/22/16:16:31 | USE REQUEST | 001234 | α | γ | B |
| .... | .... | .... | .... | .... | .... |

Fig. 5

CONTENT USE MANAGEMENT SYSTEM, CONTENT-PROVIDING SYSTEM, CONTENT-USING DEVICE AND COMPUTER READABLE MEDIUM

BACKGROUND

1. Technical Field

The present invention relates to technology for managing use of digital content.

2. Related Art

Conventionally, various types of systems have been developed for protecting the rights of an owner of copyright and other rights for digital content such as an electronic document, audio data, and multimedia data (hereinafter referred simply as "content"). In one known example system, an acquisition record is kept when a user obtains content from a database on a network. Such an acquisition record serves to deter unauthorized use of content. Further, in another known system, ID information is previously embedded in content, and a user, when attempting to use the content existing in his/her terminal, transmits the ID information from the terminal to a management server on a network and the management server then uses the ID information for keeping a record of use of the content.

SUMMARY

According to an aspect of the invention, there is provided a content use management system comprising a content-providing system and content-using devices, the content-providing system including a providing unit that provides, to the content-using device, digital content having content identification information corresponding to user-side-specific information specific to the content-using device or a user of the content-using device and a primary distribution destination field, and the content-using device including a first control unit that, when receiving from a user an instruction for using digital content, allows use of the digital content when content identification information included in the digital content corresponds to user-side-specific information specific to the content-using device or a user of the content-using device, and executes a control process in accordance with a value of the primary distribution destination field of the digital content when the content identification information included in the digital content does not correspond to the user-side-specific information.

BRIEF DESCRIPTION OF THE DRAWINGS

An exemplary embodiment of the present invention will be described in detail by reference to the following figures, wherein:

FIG. 5 shows one example of history information accumulated in a history DB;

DETAILED DESCRIPTION

An exemplary embodiment of the present invention will be described in detail with reference to the accompanying drawings.

Figure 1:
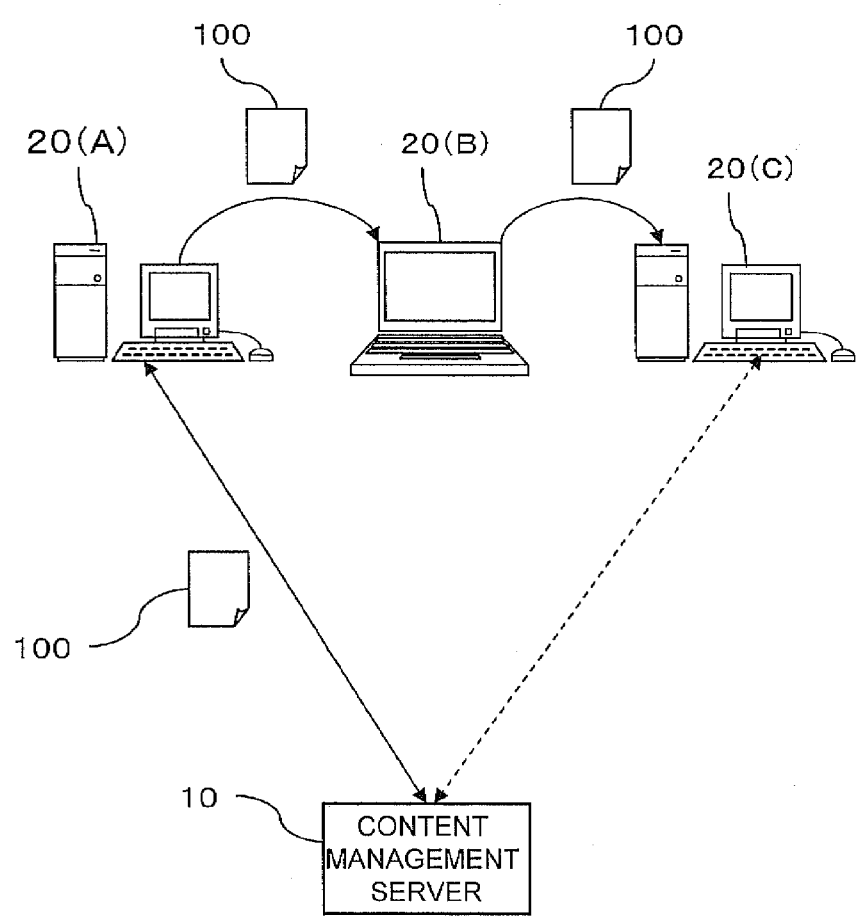
FIG. 1 schematically shows a content use management system.

As shown in FIG. 1, a content use management system of the present exemplary embodiment includes a content management server 10 and one or more user terminals 20. Although in this example only one content management server 10 is provided for simplicity of explanation, multiple content management servers 10 having the same function may be provided.

In this system, a user can download content 100 the user wishes to use from the content management server 10 to his/her user terminal 20. Further, the content 100 that is downloaded can be distributed to another user terminal 20 by, for example, attaching the content 100 to an electronic mail. The content 100 managed by the content management server 10 can be of any of various types of data such as an electronic document, audio data, image data, video data, multimedia data, a program, and so on, that is created by a word processor or other applications, and the system manages use of such content. The use of content as used herein can include a variety of forms of content use, such as viewing, playing, writing, modification, execution, or the like of content.

In the system of the present exemplary embodiment, when the user terminal 20 downloads content from the content management server 10, the content management server 10 can record acquisition of the content by the terminal as history data so that use of the content by the terminal is allowed. Further, the content management server 10 allows a user terminal 20 that can access the content management server 10 online to use content, and records the use of content in the content management server 10. Thus, a user terminal for which history of acquisition or use of content has been recorded by the content management server 10 will be hereinafter referred to as a "recorded terminal" with regard to the content.

When a user issues a content use instruction at a user terminal 20 that is in the offline state; i.e. in a state where the user terminal 20 cannot access the content management server 10, use of the content is allowed if the terminal 20 is a "recorded terminal". Even when the user terminal 20 is not a recorded terminal, the user terminal 20 is allowed to use content in its offline state, if the user terminal has received the content distributed directly from a "recorded" user terminal 20. (Hereinafter, such a terminal will be referred to as a "primary distribution destination terminal").

In contrast, a user terminal 20 receiving used content that is distributed from the primary distribution destination terminal (i.e., a "secondary distribution destination terminal") is not allowed to use the content in the offline state. Similarly, a tertiary distribution destination terminal receiving content distributed from the secondary distribution destination terminal and the subsequent-order distribution destination terminals are not allowed to use the content in their offline state.

In the present exemplary embodiment, because only the recorded terminal and the primary distribution destination terminal are allowed to use content in the offline state, the situation where content is used by an indefinite number of users can be prevented. More specifically, with regard to a recorded terminal, as history of acquisition or use of content is recorded in the content management server 10, no problem would arise by allowing the recorded terminal to use the content offline, as long as it is only intended to satisfy the purpose of grasping the distribution destination of the content. Further, although history of offline use of content by a primary distribution destination terminal cannot be recorded in the management server 10, offline use of content by the primary distribution destination terminal, which is a direct distribution destination from the recorded terminal, is allowed because, in this case, tracking the distribution destination of the content is comparatively easy. As such, when a user downloads content from the content management server 10 to his/her desktop PC and copies the content to, for example, his/her mobile PC, the user can use the content even if the mobile PC cannot access the content management server 10. As a result, improved convenience can be achieved. Improved convenience can also be achieved because, when a user distributes content downloaded by the user to interested parties, the interested parties can use the content in the offline environments.

The outline of management of content use according to the present exemplary embodiment has been described. Now, the mechanism for achieving such management will be described.

Figure 2:
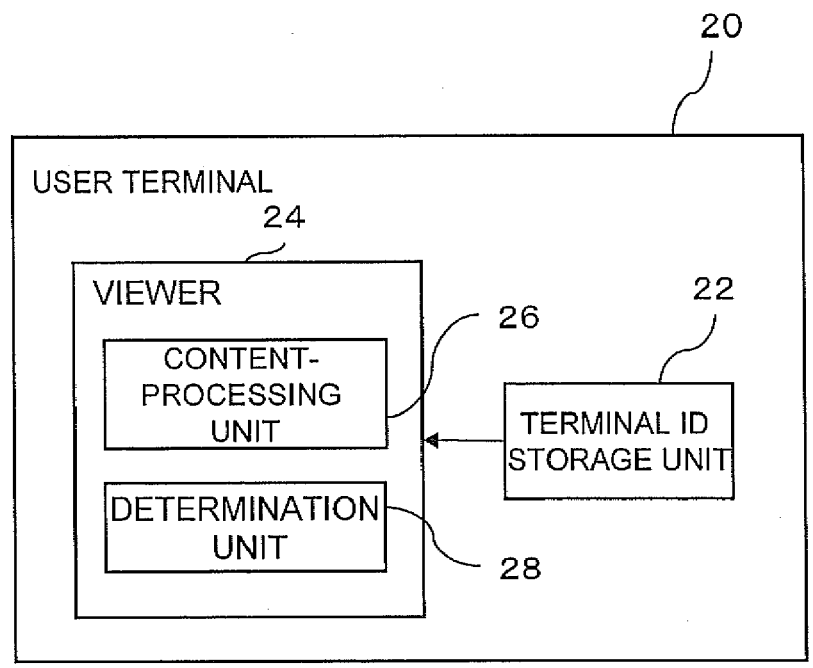
FIG. 2 is a functional block diagram showing one example structure of a user terminal.

By reference to FIG. 2, a user terminal 20 of this system includes a terminal ID storage unit 22 and a viewer 24. The terminal ID storage unit 22 is a unit that stores a terminal ID that is identification information of the user terminal 20. As the terminal ID, there can be used information specific to the user terminal 20 such as a MAC (Media Access Control) address of a network card provided in the user terminal 20, a serial number of the hard disk, a serial number of the operating system that controls the user terminal 20, and so on. When the MAC address is used as a terminal ID, for example, a storage region storing the MAC address on the network card corresponds to the terminal ID storage unit 22.

The viewer 24 is software for using content and includes a content-processing unit 26 and a determination unit 28. The content-processing unit 26 performs various types of processes when a user uses content. The content-processing unit 26 may be equivalent to conventionally known viewers or media players and other software. The determination unit 28 determines whether or not to allow a user to use content by means of the content-processing unit 26. The processes to be executed by the determination unit 28 will be described in detail below.

Figure 3:
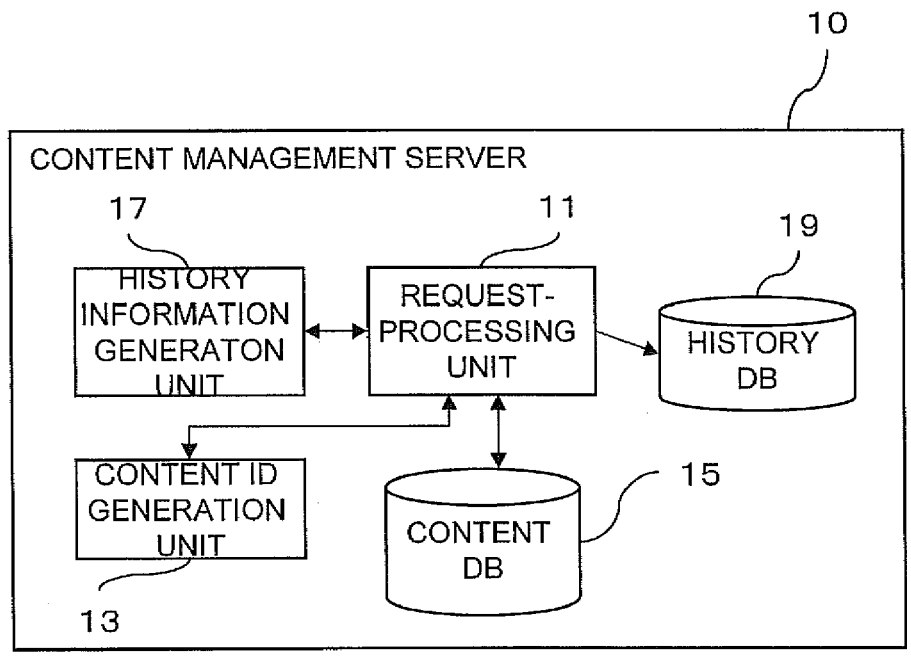
FIG. 3 is a functional block diagram showing one example structure of a content management server.

As shown in FIG. 3, the content management server 10 includes a request-processing unit 11, a content ID generation unit 13, a content DB (database) 15, a history information generation unit 17, and a history DB 19.

The request-processing unit 11 processes various types of requests provided via the network from the user terminal 20. Upon receipt of a content acquisition request from the user terminal, the request-processing unit 11, for example, creates and provides a content file 100 having a data structure illustrated in FIG. 4, or responds to a use request. Further, the request-processing unit 11 causes the history information generation unit 17 to generate history information indicative of the fact that each request has been processed, and records the history information in the history DB 19.

The content ID generation unit 13 generates a content ID to be included in the content file 100 in accordance with an instruction from the request-processing unit 11. The content ID is identification information for identifying the content itself. Simultaneously, the content ID has a value that depends on the terminal ID of the user terminal 20 to which the content file is provided and therefore serves to identify the user terminal to which the content file is provided.

The content DB 15 stores content body data that can be provided to the user terminal 20. Here, what is provided to the user terminal is a content file 100 generated by adding metadata 110 including a content ID 112 and so on to a content body 120 stored in the content DB 15, in place of the content body 120 itself. The content bodies 120 stored in the content DB 15 are distinguished from each other by using internal identification information (referred to as internal ID). This internal ID differs from the content ID that is included in the content file 100.

The history information generation unit 17 generates history information concerning the processes performed by the request-processing unit 11 in accordance with the request from the user terminal 20. The history information that is generated is registered in the history DB 19.

Figure 4:
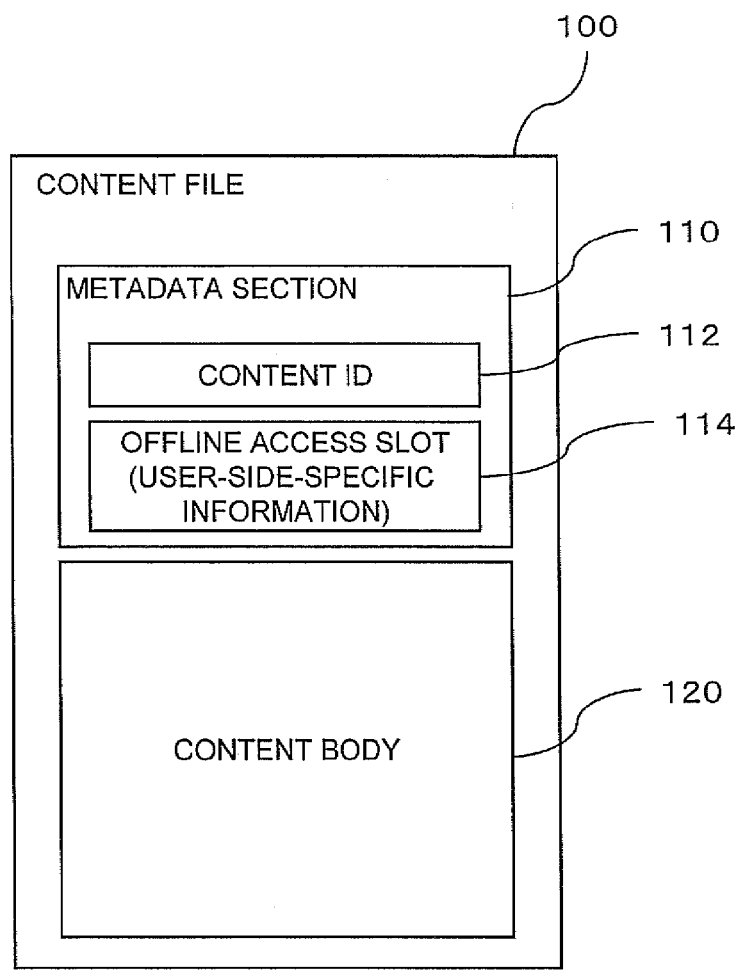
FIG. 4 schematically shows one example data structure of a content file.

By reference to FIG. 4, the content file 100 to be provided to the user terminal 20 will be described.

The content file 100 includes the metadata section 110 and the content body 120. As described above, the content body 120 is content body data accumulated in the content management server 10. Here, the content body 120 may include attribute data in addition to content itself such as a document, an image, and so on. As such, according to the present exemplary embodiment, the content ID 112 and an offline access slot 114 are added, for the purpose of management, to the content (which may include attribute data) that is processed by a conventional application, to thereby generate the content file 100, and the existing content itself of the content file 100 excluding the information added for the management purpose of the present exemplary embodiment is referred to as the content body 120.

The metadata section 110 is a storage region for data that is attached to the content body 120, such as attribute information of the content file 100, and includes the content ID 112 and the offline access slot 114. As described above, the content ID 112 is identification information that depends on the content body 120 and the terminal ID of the user terminal 20 to which the content is to be provided. The content ID may be formed by a combination of user-side-specific information (which may be either the terminal ID itself or a value obtained by applying a predetermined operation (e.g. encryption) to the terminal ID) and the internal ID of the content body 120. Further, a hash value having a sufficient length that is generated by a combination of the user-side specific information and the content body 120 (or the internal ID) may be used as the content ID. The content ID having the same value may be generated for a combination of the same user terminal 20 and the same content body 120. The value of the content ID is set in the field of the content ID 112 when the content file 100 is generated by the content management server 10.

When the user terminal 20 that is a primary distribution destination uses the content file 100 offline, the user-side-specific information of the user terminal 20 is written in the field of the offline access slot 114. Accordingly, at a time point when the content management server 10 generates the content file 100 and sends the content file 100 to the user terminal 20, the field of the offline access slot 114 is not set (i.e. is vacant). The offline access slot 114 is protected such that writing to the offline access slot 114 from any unit other than the viewer 24 is prohibited.

Further, by including information for specifying the content management server 10 that provides the content file 100

(e.g. network address information such as IP address) in the metadata section 110, the user terminal 20 can use this information for accessing the content management server 10.

The metadata section 110 may include information other than the information illustrated herein. Further, although in the present example the additional data other than the content body 120 is referred to as metadata, how the data is referred to is not an essential problem and what matters is that the content ID and the offline access slot are included. Also, the metadata section 110 is not necessarily clearly separated from the content body 120, and therefore the metadata section 110 may be included in the content body 120 in the form of an electronic watermark, for example.

By reference to FIG. 5, the history information registered in the history DB 19 will be described. In this exemplary embodiment, one piece of history information is registered for each request from the user terminal 20 (in other words, for each process performed for the request). The history information includes items including the time and date a request is received, event information indicative of request type, an internal ID of requested content, a content ID included in the request ("acquired content ID"), a content ID issued by the content management server 10 in accordance with the request, and user-side-specific information included in the request. These items of history information that are recorded will help to provide various types of information in the future. For example, a combination of the time and date and the user-side-specific information will reveal which user terminal has issued a request, and information concerning the "issued content ID" will reveal the content ID provided to the user terminal. Further, the internal ID of content will reveal which content body is requested.

In addition, when the "acquired content ID" is known, by checking the information value of a user terminal having history information including this acquired content ID as the "issued content ID," it is possible to know to which user terminal the content file concerning this request was provided, thereby helping to analyze the distribution route of the content.

Further, when a request from the user terminal 20 includes a user ID of a user that has issued the request, the user ID may be included in the history information. It is also possible to send the value of the offline access slot 114 within the content file 100 from the user terminal 20 to the content management server 10 at the time of issuing a request for use of the content file and include this value in the history information.

The process flow of the system according to the present exemplary embodiment will now be described.

Figure 6:
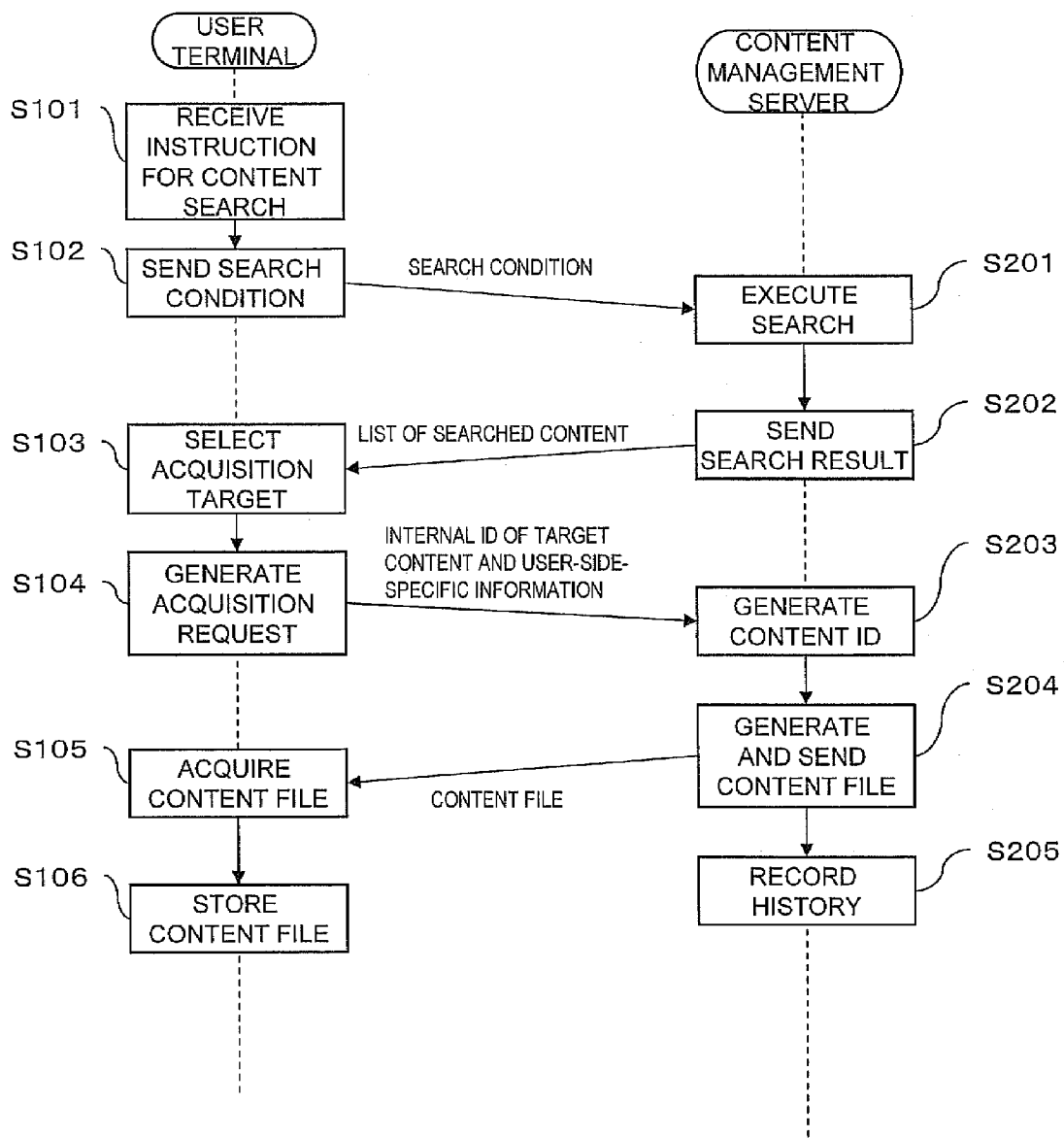
FIG. 6 is a flowchart showing an example operation of the system during acquisition of content.

First, by reference to FIG. 6, a process flow for downloading content from the content management server 10 to the user terminal 20 will be described. In this procedure, a user first inputs a content search instruction to the viewer 24 of the user terminal 20 (S101). When a search condition such as a keyword or the like is input by the user, the viewer 24 uses a communication protocol to access the content management server 10 for sending the search condition (S102).

The content management server 10 searches and retrieves a content body 120 matching the search condition from the content DB 15 (S201), and returns a list of content that is retrieved (e.g. a list of internal IDs) to the viewer 24 as a search result (S202).

When the viewer 24 displays the search result and the user selects content that he/she wishes to obtain from the search result (S103), the viewer 24 generates an acquisition request including the internal ID of the selected content and user-side-specific information generated from the terminal ID stored in the terminal ID storage unit 22, and then sends the acquisition request to the content management server 10 (S104). Although in the present example the user-side-specific information is included in the acquisition request, the user-side-specific information is not necessarily included in the acquisition request, so long as a correspondence between the acquisition request and the user-side-specific information of the user terminal that issues the acquisition request can be recognized by the content management server 10. This is similarly applied to the case of a use request that will be described below.

Although in the above example the content to be acquired is found by search, the present invention is not limited to this example. For example, it is also possible to use a user interface that allows a user to follow the directory structure in the content DB 15 to thereby find the content the user wishes to acquire.

In the content management server 10 that receives the acquisition request, the request-processing unit 11 extracts the requested content body 120 from the content DB 15 and causes the content ID generation unit 13 to generate a content ID (S203). The content ID generation unit 13 then generates a content ID based on the user-side-specific information included in the acquisition request and information of the content body 120 that is requested. The request-processing unit 11 generates a content file 100 including the content ID and the content body and sends the content file 100 to the user terminal 20 (S204). At this time, the history information generation unit 17 generates history information concerning the acquisition request (in other words, history indicating that content has been provided) and registers the history information in the history DB 19. Here, since the content ID is not included in the acquisition request, the history information does not include an "acquired ID" (see the history information in the top line in FIG. 5, for example).

The viewer 24 of the user terminal 20 acquires the content file 100 (S105), and stores the content file 100 in the storage device of the user terminal 20 (S106).

Figure 7:
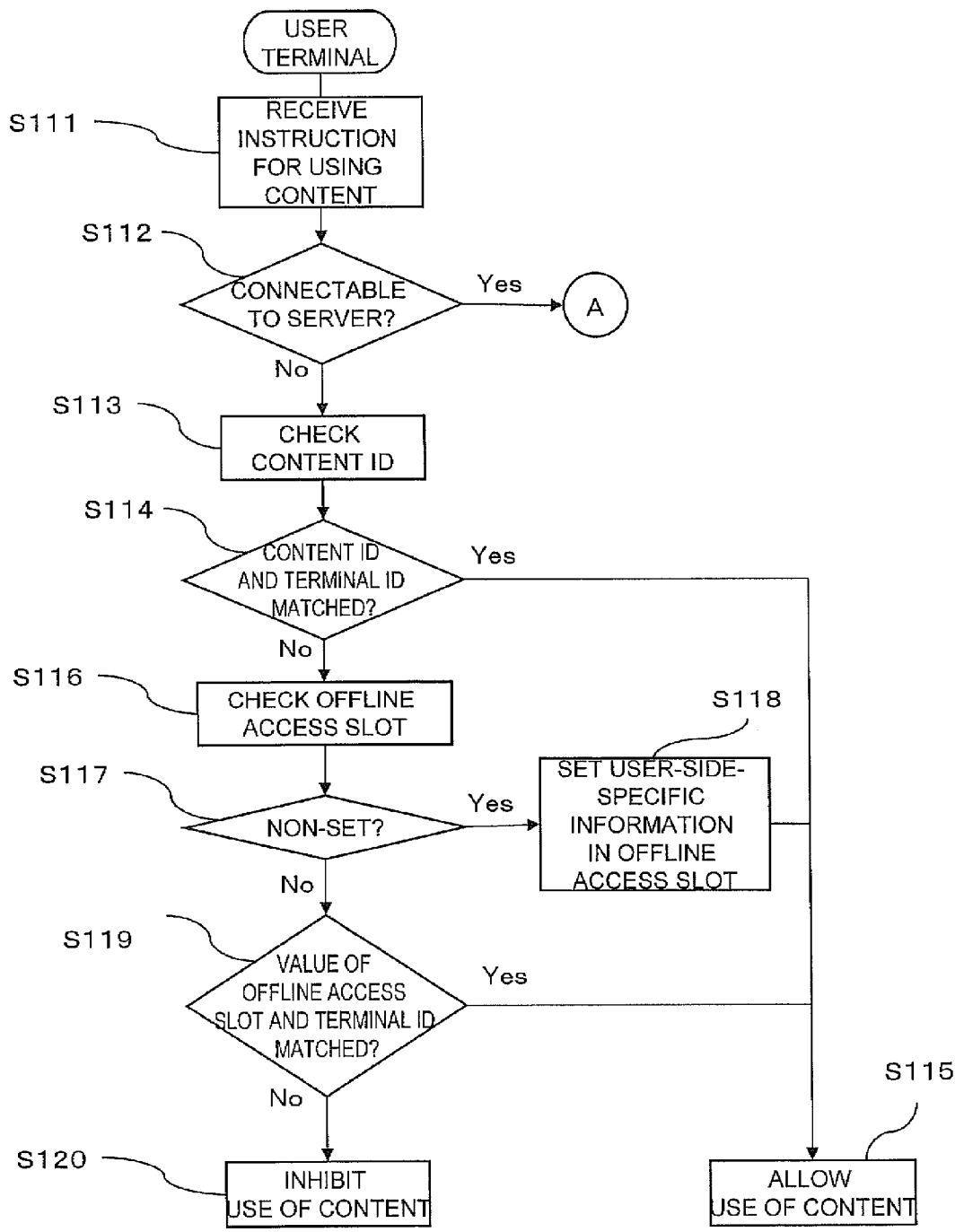
FIG. 7 is a flowchart showing an example operation of the user terminal during use of content.
Figure 8:
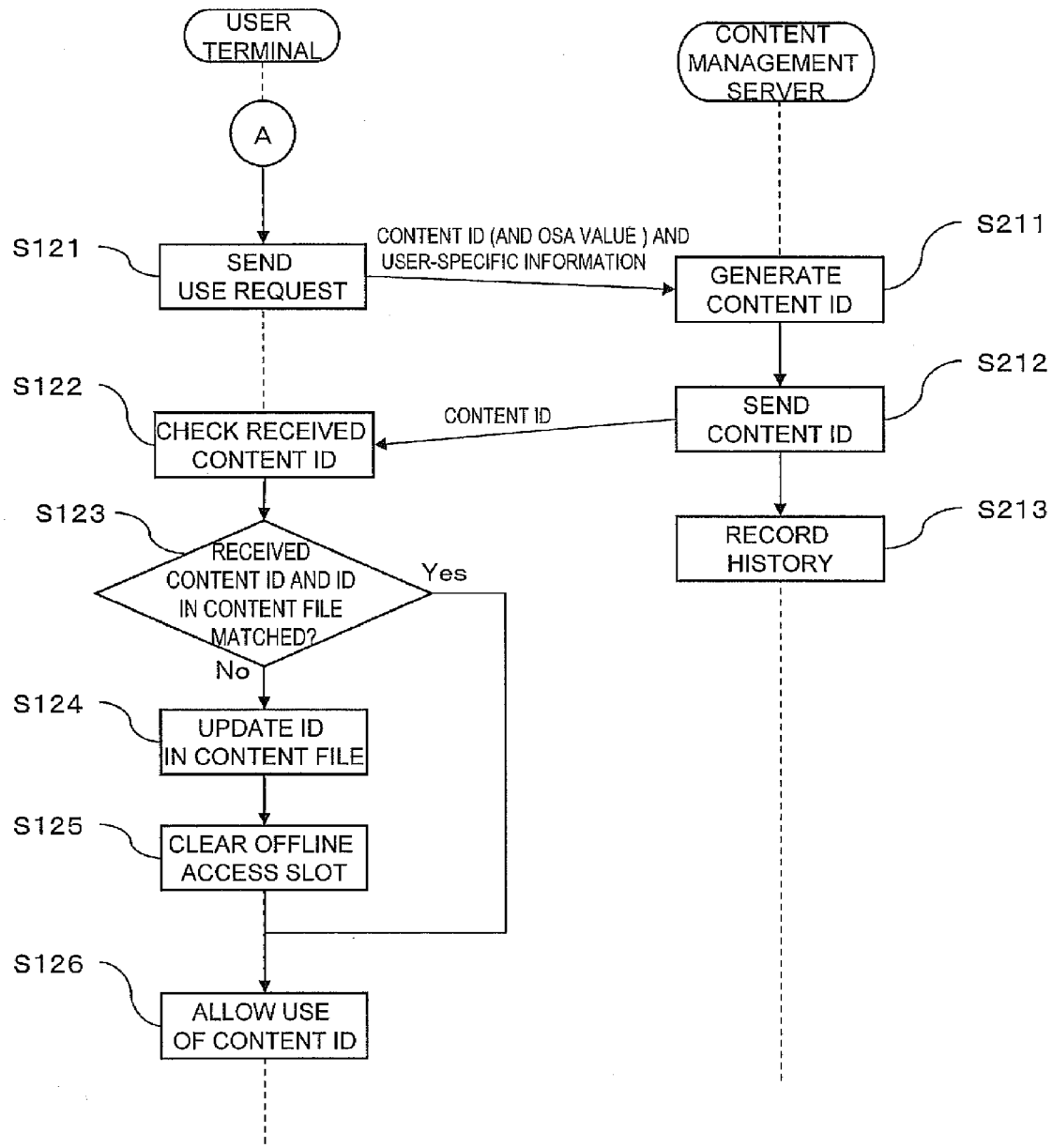
FIG. 8 is a flowchart showing an example operation of the system when the user terminal can be connected to the content management server during use of content.

Next, by reference to FIGS. 7 and 8, there will be described the process flow performed in a case where a user inputs an instruction for using the content file 100 stored in the storage device of the user terminal 20.

When an instruction for using the content file 100 stored in the storage device is input to the user terminal 20 (S111), the determination unit 28 of the viewer 24 determines, by means of a communication protocol, whether or not the user terminal can access the content management server 10 designated by the content file 100 (S112). If the user terminal 20 can connect to the content management server 10, the process proceeds to the procedures in FIG. 8 (which will be described below).

If, on the other hand, the user terminal 20 cannot connect to the content management server 10, the determination unit 28 checks the content ID 112 in the content file 110 (S113) to determine whether or not the content ID 112 matches the terminal ID in the terminal ID storage unit 22 (S114). More specifically, the determination unit 28 generates user-side-specific information from the terminal ID, and uses the user-side-specific information and the information of the content body 120 in the content file 100 to generate a content ID by means of the same algorithm as used in the content ID generation unit 13 of the content management server 10, for example. If the generated content ID corresponds to the content ID 112 in the content file 100, a determination is made that the content ID 112 matches the terminal ID. The content ID 112 matches the terminal ID only in the case where the user terminal 20 has acquired the content file 100 from the content management server 10 or in the case where the user terminal 20 has previously issued to the content management server 10 a use request with regard to the content file 100. In either case, the user terminal is a recorded terminal that is recorded in the history DB 19 as a terminal having the content file 100. In such a case, the determination unit 28 allows use of the content file (S115). In response to this permission, the content processing unit 26 extracts the content body 120 from the content file 100 so that the user can use the content.

If the determination in step S114 shows that the content ID 112 does not match the terminal ID, the determination unit 28 then checks the value of the offline access slot 114 in the content file 100 (S116).

If the check result indicates that the offline access slot 114 is not set (i.e. if the determination result is Yes in S117), the determination unit 28 sets the user-side-specific information generated from the terminal ID in the terminal ID storage unit 22 in the offline access slot 114 (S118), and allows the content processing unit 26 to use the content file (S115). This corresponds to a case where the user terminal 20 is a primary distribution destination terminal, for the following reason. Specifically, if the user terminal 20 is a recorded terminal, the value of the offline access slot 114 remains in a non-set state even if the content file is used offline any number of times, and the value of the offline access slot 114 is not in a non-set state (i.e. the determination result in step S117 is Yes) only if a primary distribution destination terminal attempts to use content file offline.

If, on the other hand, the determination result in step S117 is No, the determination unit 28 determines whether or not the value that is set in the offline access slot 114 matches the terminal ID stored in the terminal ID storage unit 22 (S119). Specifically, the determination unit 28, for example, generates user-side-specific information from the terminal ID and determines "match" if the user-side-specific information is identical with the value of the offline access slot 114, and otherwise determines "no match." The determination result in S119 is "match" in a case where a primary distribution destination terminal has used the content offline in the past and the user-side-specific information of the primary distribution destination terminal was set in the offline access slot 114, and now the primary distribution destination terminal attempts to use the content once again in the offline state. In this case, the determination unit 28 allows use of the content (S115).

If "no match" is determined in step S119, meaning that the user terminal 20 is a secondary or subsequent-order distribution destination, the determination unit 28 does not allow use of the content file 100 (S120).

The determination process for determining whether or not to allow use the content file 100 in a case where use of content file 100 is instructed by a user terminal 20 that is in the offline state has been described with reference to FIG. 7. Now, with reference to FIG. 8, the process procedure of the system in a case where a user terminal 20 is in the online state will be described.

When an instruction for using a content file 100 in the storage device is issued, the viewer 24 generates a use request including user-side-specific information generated from the terminal ID and the content ID of the content file 100 and sends the use request to the content management server 10, if the user terminal can access the content management server 10 (S121). In addition to this, the value of the offline access slot (OAS) in the content file 100 may be included in the use request.

Upon receiving the use request from the user terminal 20, the content management server 10 generates a content ID based on the user-side-specific information included in the request and information of the content body specified by the content ID included in the request (S211) and sends the generated content ID to the user terminal 20 (S212). The content management server 10 then generates history information concerning the use request and registers the history information in the history DB 19 (S213). Because the use request includes a content ID, the history information includes a value of "acquired content ID" (see the second to fourth records in FIG. 5). Further, when a value of the offline access slot 114 is included in the use request, the value may be included in the history information.

In the user terminal 20 receiving the content ID from the content management server 10 in response to the use request, the determination unit 28 checks the received content ID (S122) to determine whether or not the received content ID corresponds to the content ID in the content file 100 that is the subject of the use request (S123). If the content IDs correspond to each other, this means that the user terminal 20 is a recorded terminal. Accordingly, the content processing unit 26 is allowed to use the content file 100 (S126).

When, on the other hand, the determination result in step S123 is NO, this means that the user terminal 20 is not a recorded terminal (i.e. the terminal is not recorded in the content management server 10). However, now that the history information of the user terminal 20 including the user-side specific information has been recorded in the content management server 10 by the use request provided this time, the user terminal 20 has now become a recorded terminal. Accordingly, the determination unit 28 changes the content ID in the content file 100 to the content ID that is received in step S122 (S124), and then allows the content processing unit 20 to use the content file 100. This enables the user terminal 20 to freely use the content file 100 even in the offline state. At this time, by clearing the offline access slot 114 of the content file 100 into an non-set state simultaneously with the update of the content ID (S125), another user terminal 20 that receives the content file 100 distributed from the user terminal 20 can become a primary distribution destination terminal and can use the content file 100 even in the offline state.

Figure 9:
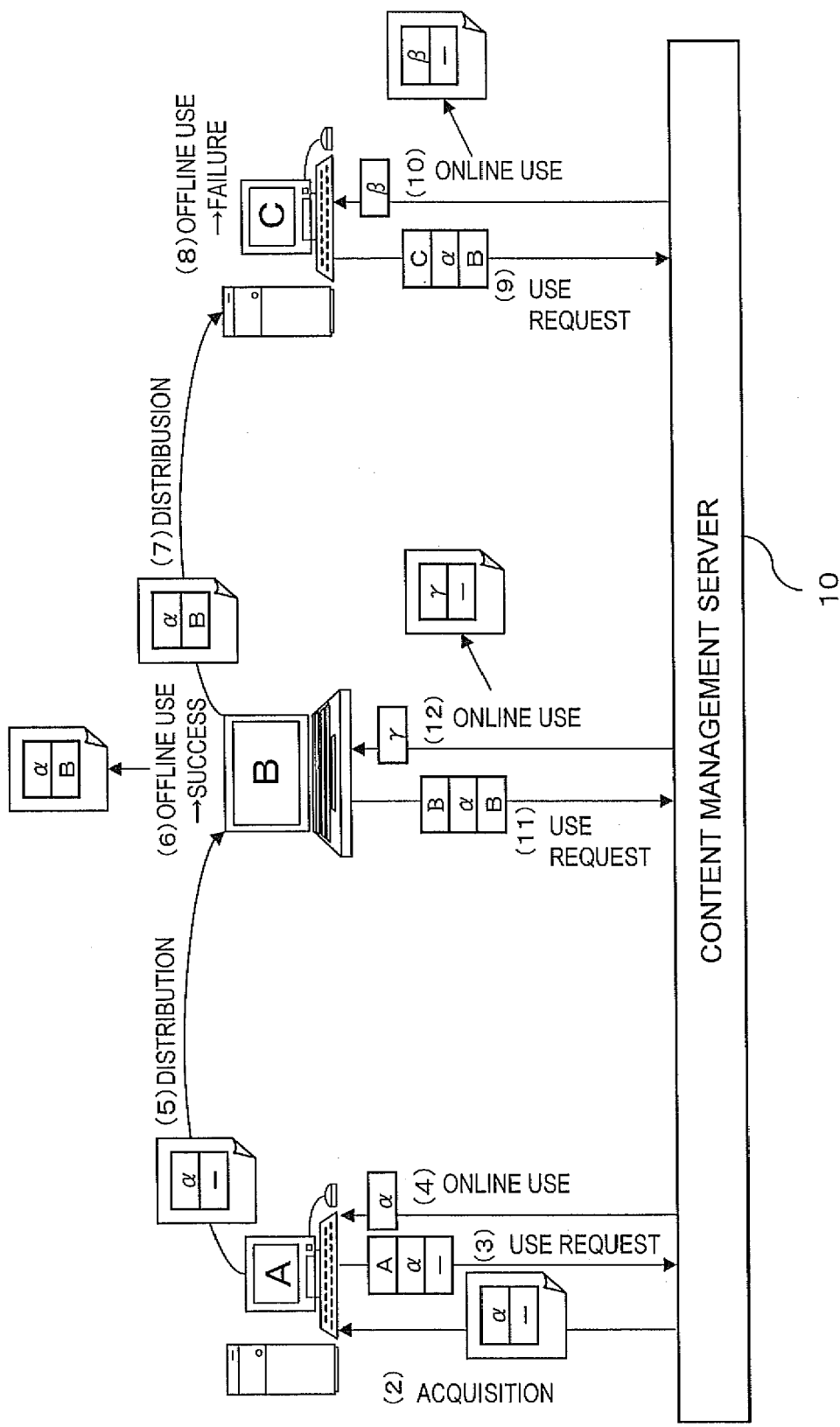
FIG. 9 shows a specific example of acquisition, use, and distribution of content.
Figure 10:
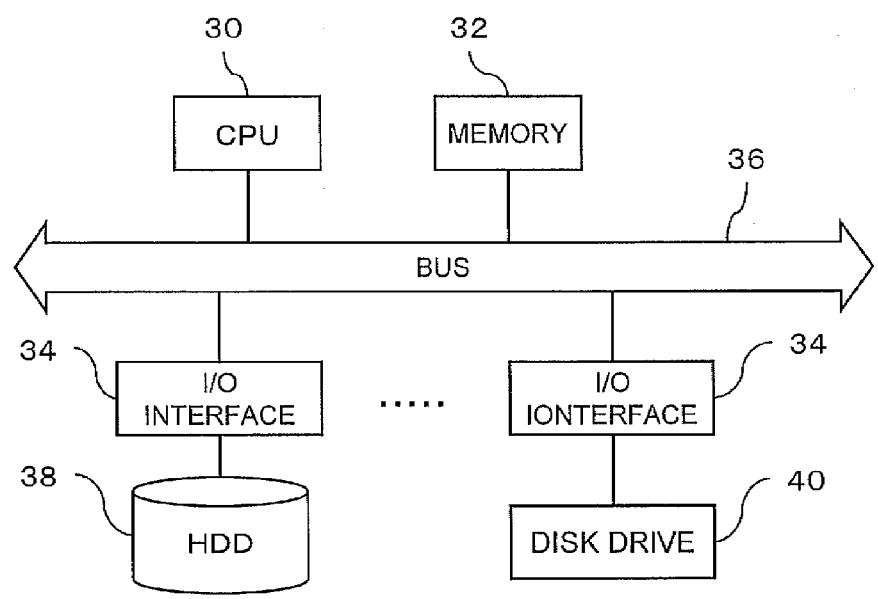
FIG. 10 shows one example hardware structure of a computer in which the apparatus of the present exemplary embodiment is mounted.

By reference to FIG. 9, a specific example of distribution flow of content in the present system will be described. This example corresponds to the history information shown in FIG. 5, which is also to be referred to as required.

(1) First, in order to acquire content having an internal ID "001234," the user terminal A sends to the content management server 10 an acquisition request including his/her own user-side specific information "A."

(2) The content management server 10 generates a content ID "α" based on the user-side specific information "A" and the information of the content body having the internal ID "001234," and further generates a content file including the content ID "α," a blank offline access slot, and a content body and returns the content file back to the user terminal A. At this time, the content management server 10 generates a history record as indicated in the top line in FIG. 5 and records the history record in the history DB 19.

(3) When a user issues an instruction for using the content file by the user terminal A that has received the content file, assuming that the user terminal A can access the content management server 10, the viewer 24 generates a use request including the content ID "α" and the user-side specific information "A" (with the offline access slot being blank) and sends this use request to the content management server 10.

(4) The content management server 10 generates a content ID in response to the user request. In this case, the same user terminal A as that in the acquisition request requests the same content "001234," and the same content ID "α" is generated. The content management server 10 returns the generated content ID "α" to the user terminal A, generates a history record concerning the user request as indicated in the second line from the top in FIG. 5, and records the history record in the history DB 19.

Upon receiving the content ID "α," the user terminal A allows the user to use the content file, because the received content ID is identical with the content ID in the content file. With regard to this use, the content ID in the content file remains unchanged and the offline access slot also remains blank.

(5) Then, a copy of the content file is distributed from the user terminal A to a user terminal B via, for example, an electronic mail or the like.

(6) It is now assumed that the user terminal B cannot access the content management server 10 when a user operating the user terminal B issues an instruction for using the content file. In this case, in view that the offline access slot of the content file is blank (non-set state), the determination unit 28 sets the user-side specific information "B" of the user terminal B in the offline access slot and then allows the user of the user terminal B to use the content file. In this manner, offline use of a content file at the primary distribution destination is allowed.

(7) Then, a copy of the content file is distributed from the user terminal B to a user terminal C via, for example, an electronic mail or the like. Here, with regard to the content file to be distributed, while the content ID "α" is unchanged, the user-side specific information "B" of the user terminal B is now set in the offline access slot.

(8) It is now assumed that a user terminal C cannot access the content management server 10 when a user operating the user terminal C issues an instruction for using the content file. In this case, because the user-side specific information 37 B," which differs from that of the user terminal C, is set in the offline access slot of the content file, the determination unit 28 prohibits use of the content file. More specifically, use of the content file in the offline state by the user terminal C, which is a secondary distribution destination, is not possible.

(9) Thereafter, when an instruction for using the content file is issued in a state where the user terminal C can access the content management server 10, the user terminal C sends to the content management server 10 a use request including his/her own user-side-specific information "C" and the content ID "α". Here, the value "B" of the offline access slot may be sent together with the use request.

(10) In response to the use request, the content management server 10 generates a content ID "β." Here, because this request is based on a request from the user terminal C that differs from the user terminal A, the value of the content ID is set to "β," which is different from the value "α." The content management server 10 returns the generated content ID "β" to the user terminal C.

Further, the content management server 10 generates history information concerning this use request and registers the history information in the history DB 19 (see the third history record from the top in FIG. 5). By referring to this history information, it is possible to recognize that the content "001234" provided to the user terminal A is distributed to and used by the user terminal C. More specifically, it is possible, from the history information, to ascertain from which recorded terminal the user terminal that has issued the use request for the content receives distributed content (directly or via any other user terminal). Further, when the value of the offline access slot is sent with the use request, the primary distribution destination terminal can be specified by the value. Specifically, if the user terminal that has issued the use request has received the content file from a recorded terminal via a primary distribution destination terminal, it is possible to ascertain not only the recorded terminal but also the primary distribution destination terminal as a distribution route of the content file by checking the value of the offline access slot.

When the user terminal C has received the content ID "β" use of the content file is allowed, and simultaneously, the content ID of the content file is changed to "β" and the offline access slot is cleared.

(11) Thereafter, when the user terminal B is allowed to access the content management server 10 and an instruction for using the content file is input, the user terminal B sends to the content management server 10 a use request including his/her own user-side-specific information "B" and the content ID "α" (and also the offline access slot "B" as required).

(12) In response to this use request, the content management server 10 generates a new content ID "γ" and returns the content ID to the user terminal B. Further, with regard to the use request, the content management server 10 generates a history record as shown in the fourth line from the top in FIG. 5 and records the history record in the history DB 19.

In the user terminal B that has received the content ID "γ," use of the content file is allowed and the content ID of the content file is changed to "γ," and the offline access slot is cleared.

Although in the above exemplary embodiment the content management sever 10 unconditionally accepts a use request of content issued by the user terminal 20, the content management server 10 may determine whether or not to allow a use request. For example, it is possible to provide in the content management server 10 an access control list that registers presence or absence of access right of each user to each content, so that the content management server 10 can determine whether or not to allow the use request with regard to the user-specific information of the requesting user terminal, on the basis of the access control list. In case of allowance, the content management server 10 can return to the user terminal 20 a reply including the indication of allowance and a generated content ID. Upon receiving this reply, the user terminal 20 can execute the same processing as described above. When, on the other hand, the use request is not allowed, the content management server 10 returns to the user terminal 20 a reply indicating non-allowance. In the user terminal 20, which receives this reply, the determination unit 28 does not allow use of the content.

Further, in the above exemplary embodiment, the content management server 10 may encrypt the content body 120 and include the encrypted content body 120 in the content file 100. In this case, on the side of the user terminal 20, the content-processing unit 26 may be allowed to decrypt and open the encrypted content body only when the determination unit 28 allows use of the content file 100. By thus encrypting the content body in the content file 100 that is to be distributed and stored, it is possible to prevent a case where the content body is used other than via the viewer 24.

Also, although in the above exemplary embodiment the terminal ID specific to the hardware or software of the user terminal 20 is used to determine whether or not to allow use of content for each user terminal 20, this is merely one example. Alternatively, the determination may be performed for each user. In this case, a user ID may be used in place of the terminal ID. The user ID can be obtained by processing such as login authentication when a user logs in to the user terminal 20 or to the present system. When the above determination is performed for each user, a given user can have the same authority to content even when the user uses different terminals.

In addition, the content management server 10 is not necessarily mounted on a single computer, and the functions of the content management server 10 can be dispersed over multiple computers on a network. For example, in one possible exemplarily embodiment, the function of storing and providing content and the function of receiving a use request and managing the history can be implemented in different computers.

The content management server 10 and the user terminal 20 described above are typically implemented by executing a program that describes the function or process content of each unit described above in a general-purpose computer. The computer has a circuit structure including, as hardware, a CPU (Central Processing Unit) 30, a memory (primary storage) 32, various I/O (input/output) interfaces 34, or the like that are connected via a bus 36, for example. Further, a hard disk drive 38 and a disk drive 40 for reading a portable non-volatile recording medium of various standards such as CD, DVD, and flash memory, are connected via the I/O interface 34, for example, to the bus 36. Such a drive 38 or 40 functions as an external storage device with respect to the memory. The program describing the process content of the exemplary embodiment is stored in a secondary storage device such as the hard disk drive 38 and installed in the computer, via the recording medium such as CD and DVD or via the network. Then, the program stored in the secondary storage device is read in the memory and executed by the CPU, thereby achieving the process of the exemplary embodiment.

The foregoing descriptions of the exemplary embodiments of the present invention have been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical application, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A content use management system comprising:
    a content-providing system; and
    a content-using device;
    said content-providing system including a processor that provides, to said content-using device, digital content having content identification information corresponding to user-side-specific information specific to said content-using device or a user of said content-using device, the digital content having primary distribution destination information;
    said content-using device including a first control processor that, when receiving an instruction for using digital content from a user, allows use of the digital content when content identification information included in the digital content corresponds to user-side specific information specific to said content-using device or a user of said content-using device;
    said first control processor, when said content-using device cannot access said content-providing system, executing a control process in accordance with the primary distribution destination information of the digital content when the content identification information included in the digital content does not correspond to the user-side-specific information or the user thereof;
    said first control processor, when said content-using device cannot access said content-providing system, allowing use of the digital content when the user-side-specific information specific to the content-using device or the user thereof is set in the primary distribution destination information of the digital content;
    said first control processor, when said content-using device cannot access said content-providing system, writing the user-side-specific information specific to the content-using device or the user thereof in the primary distribution destination information and then allowing use of the digital content when the primary distribution destination information is not set;
    said first control processor, when said content-using device cannot access said content-providing system, not allowing use of the digital content when information that does not correspond to the user-side-specific information specific to the content-using device or the user thereof is set in the primary distribution destination information of the digital content.

2. The content use management system according to claim 1, wherein said content-providing system further comprises a first recording unit that, when said content-providing system provides digital content to said content-using device, records providing history including content identification information of the digital content and user-side-specific information specific to said content-using device or a user of said content-using device.

3. The content use management system according to claim 1, in which said content-using device further comprises a second control processor that, if said content-using device can access said content-providing system when receiving an instruction for using digital content, does not cause said first control-processor to perform control and allows use of the digital content, and sends to said content-providing system a use notice including content identification of the digital content and user-side-specific information specific to said content-using device or the user of thereof.

4. The content use management system according to claim 3, wherein said content-providing system further comprises a second recording unit that, upon receiving the use notice from said content-using device, records use notice history including the content identification information and the user-side-specific information included in the use notice.

5. The content use management system according to claim 3, wherein said content-providing system further comprises a response unit that generates content identification information corresponding to the user-side-specific information included in the use notice concerning the digital content and sends the content identification information to said content-using device, and said content-using device further comprises an update unit that updates content identification information in the digital content by using the content identification information received in response to the use notice concerning the digital content.

6. The content use management system according to claim 1, wherein said content-using device further comprises a second control processor that, if said content-using device can access said content-providing system when receiving an instruction for using digital content, does not cause said first control-processor to perform control and sends to said content-providing system a use notice including content identification information of the digital content and user-side-specific information specific to said content-using device or the user thereof, and controls whether or not to allow using the digital content, on the basis of a response to the use notice from said content-providing system.

7. The content use management system according to claim 6, wherein said content-providing system further comprises a second recording unit that, upon receiving the use notice from said content-using device, records use notice history including the content identification information and the user-side-specific information included in the use notice.

8. The content use management system according to claim 6, wherein said content-providing system further comprises a response unit that generates content identification information corresponding to the user-side-specific information included in the use notice concerning the digital content and sends the content identification information to said content-using device, and said content-using device further includes an update unit that updates content identification information in the digital content by using the content identification information received in response to the use notice concerning the digital content.

9. A content use management system comprising:
a content-providing system; and
a content-using device;
said content-providing system including a processor that provides, to said content-using device, digital content having content identification information corresponding to user-side-specific information specific to said content-using device or a user of said content-using device, the digital content having primary distribution destination information;
said content-using device including a first control processor that, when receiving an instruction for using digital content from a user, allows use of the digital content when content identification information included in the digital content corresponds to user-side specific information specific to said content-using device or a user of said content-using device;
said first control processor, when said content-using device cannot access said content-providing system, executing a control process in accordance with the primary distribution destination information of the digital content when the content identification information included in the digital content does not correspond to the user-side-specific information or the user thereof;
said content-using device including a second control processor that, if said content-using device can access said content-providing system when receiving an instruction for using digital content, does not cause said first control processor to perform control and allows use of the digital content, and sends to said content-providing system a use notice including content identification of the digital content and user-side-specific information specific to said content-using device or the user of thereof;
said content-providing system including a response unit that generates content identification information corresponding to the user-side-specific information included in the use notice concerning the digital content and sends the content identification information to said content-using device, and said content-using device further comprises an update unit that updates content identification information in the digital content by using the content identification information received in response to the use notice concerning the digital content;
said update unit of said content-using device changes the primary distribution destination information to a non-set state when a value of the content identification information in the digital content is changed by update.

10. A content use management system comprising:
a content-providing system; and
a content-using device;
said content-providing system including a processor that provides, to said content-using device, digital content having content identification information corresponding to user-side-specific information specific to said content-using device or a user of said content-using device, the digital content having primary distribution destination information;
said content-using device including a first control processor that, when receiving an instruction for using digital content from a user, allows use of the digital content when content identification information included in the digital content corresponds to user-side specific information specific to said content-using device or a user of said content-using device;
said first control processor, when said content-using device cannot access said content-providing system, executing a control process in accordance with the primary distribution destination information of the digital content when the content identification information included in the digital content does not correspond to the user-side-specific information or the user thereof;
said content-using device including a second control processor that, if said content-using device can access said content-providing system when receiving an instruction for using digital content, does not cause said first control processor to perform control and sends to said content-providing system a use notice including content identification information of the digital content and user-side-specific information specific to said content-using device or the user thereof, and controls whether or not to allow using the digital content, on the basis of a response to the use notice from said content-providing system;
said update unit of said content-using device changes the primary distribution destination information to a non-set state when a value of the content identification information in the digital content is changed by update.

11. A content-providing system comprising:
a receiver that receives a request for content from a first client;
a processor that generates a content file including (i) information for identifying the first client and the requested content, and (ii) information which identifies a second client that can use the requested content when the content-providing system cannot be accessed by a content-using device; and
a transmitter that provides the generated content file to the first client.

12. A portable non-volatile computer-readable recording medium storing a program causing a computer to execute a process for providing content, the process comprising:
receiving a request for content from a first client;
generating a content file including (i) information for identifying the first client and the requested content, and (ii) information which identifies a second client that can use the requested content when a content-providing system cannot be accessed by a content-using device; and
providing the generated content file to the first client.

13. A content-using device comprising:
a memory unit that stores digital content provided from a content-providing system;
a first control unit that, in a case where an instruction for using digital content within the memory unit is received from a user, allows use of the digital content when content identification information included in the digital content corresponds to identification information that identifies the content-using device or a user thereof, and performs a control process in accordance with primary distribution destination information in the digital content when the content identification information included in the digital content does not correspond to the identification information that identifies the content-using device or a user thereof;

said first control unit, when the content-using device cannot access the content-providing system, allowing use of the digital content when the user-side-specific information specific to the content-using device or the user thereof is set in the primary distribution destination information of the digital content;

said first control unit, when the content-using device cannot access the content-providing system, writing the user-side-specific information specific to the content-using device or the user thereof in the primary distribution destination information and then allowing use of the digital content when the primary distribution destination information is not set;

said first control unit, when the content-using device cannot access the content-providing system, not allowing use of the digital content when information that does not correspond to the user-side-specific information specific to the content-using device or the user thereof is set in the primary distribution destination information of the digital content.

14. A portable non-volatile computer-readable recording medium storing a program causing a computer to execute a process for content use, the process comprising:

storing, in a memory unit, digital content provided from a content-providing system; and in a case where an instruction for using digital content within the memory unit is received from a user, allowing use of the digital content when content identification information included in the digital content corresponds to identification information that identifies the content-using device or a user thereof, and performing a control process in accordance with primary distribution destination information in the digital content when the content identification information included in the digital content does not correspond to the identification information that identifies the content-using device or a user thereof;

when the content-using device cannot access the content-providing system, allowing use of the digital content when the user-side-specific information specific to the content-using device or the user thereof is set in the primary distribution destination information of the digital content;

when the content-using device cannot access the content-providing system, writing the user-side-specific information specific to the content-using device or the user thereof in the primary distribution destination information and then allowing use of the digital content when the primary distribution destination information is not set; and when the content-using device cannot access the content-providing system, not allowing use of the digital content when information that does not correspond to the user-side-specific information specific to the content-using device or the user thereof is set in the primary distribution destination information of the digital content.

15. A content use managing method in a content use management system comprising a content-providing system and a content-using device, the method comprising:

providing, to the content-using device, digital content having user-side-specific information specific to the content-using device or a user of the content-using device and primary distribution destination information;

upon receiving an instruction for using digital content from a user, allowing use of the digital content when content identification information included in the digital content corresponds to the user-side-specific information specific to the content-using device or the user of the content-using device;

executing, using a processor, a control process in accordance with the primary distribution destination information of the digital content when the content identification information included in the digital content does not correspond to the user-side-specific information;

when the content-using device cannot access the content-providing system, allowing use of the digital content when the user-side-specific information specific to the content-using device or the user thereof is set in the primary distribution destination information of the digital content;

when the content-using device cannot access the content-providing system, writing the user-side-specific information specific to the content-using device or the user thereof in the primary distribution destination information and then allowing use of the digital content when the primary distribution destination information is not set; and when the content-using device cannot access the content-providing system, not allowing use of the digital content when information that does not correspond to the user-side-specific information specific to the content-using device or the user thereof is set in the primary distribution destination information of the digital content.

16. A content-providing method comprising:

receiving a request for content from a first client;

generating, using a processor, a content file including information for identifying the first client and the requested content and information which identifies a second client that can use the requested content when a content-providing system cannot be accessed by a content-using device; and providing the generated content file to the first client.

17. A content-using method in a content-using device, comprising:

storing, in a memory unit, digital content provided from a content-providing system;

in a case where an instruction for using digital content within the memory unit is received from a user, allowing use of the digital content when content identification information included in the digital content corresponds to identification information that identifies the content-using device or a user thereof, and performing a control process in accordance with primary distribution destination information in the digital content when the content identification information included in the digital content does not correspond to the identification information that identifies the content-using device or a user thereof;

when the content-using device cannot access the content-providing system, allowing use of the digital content when the user-side-specific information specific to the content-using device or the user thereof is set in the primary distribution destination information of the digital content;

when the content-using device cannot access the content-providing system, writing the user-side-specific information specific to the content-using device or the user thereof in the primary distribution destination information and then allowing use of the digital content when the primary distribution destination information is not set; and when the content-using device cannot access the content-providing system, not allowing use of the digital content when information that does not correspond to the user-side-specific information specific to the content-using device or the user thereof is set in the primary distribution destination information of the digital content.

* * * * *